DONALDSON, SHEETS & MILLER
Gang-Plow.
No. 57,688. Patented Sept. 4, 1866.
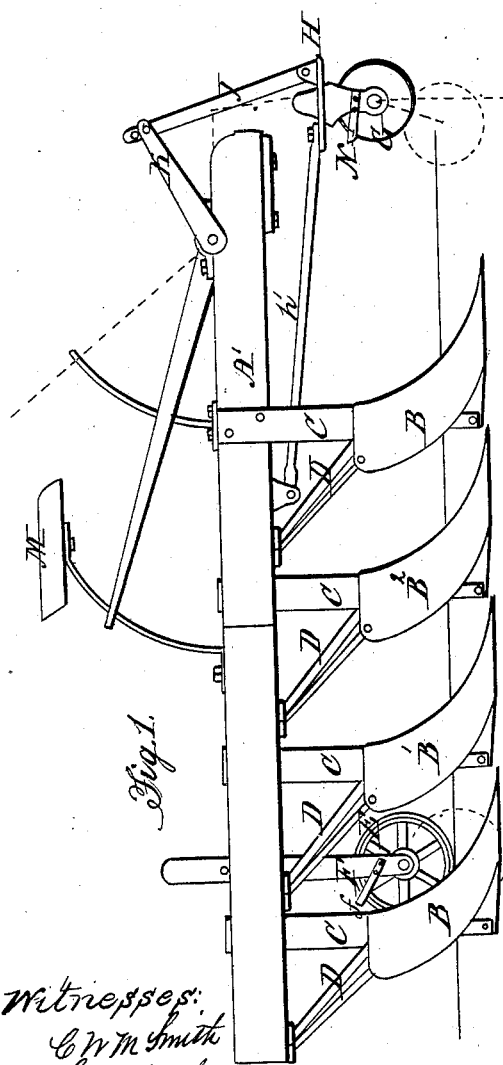
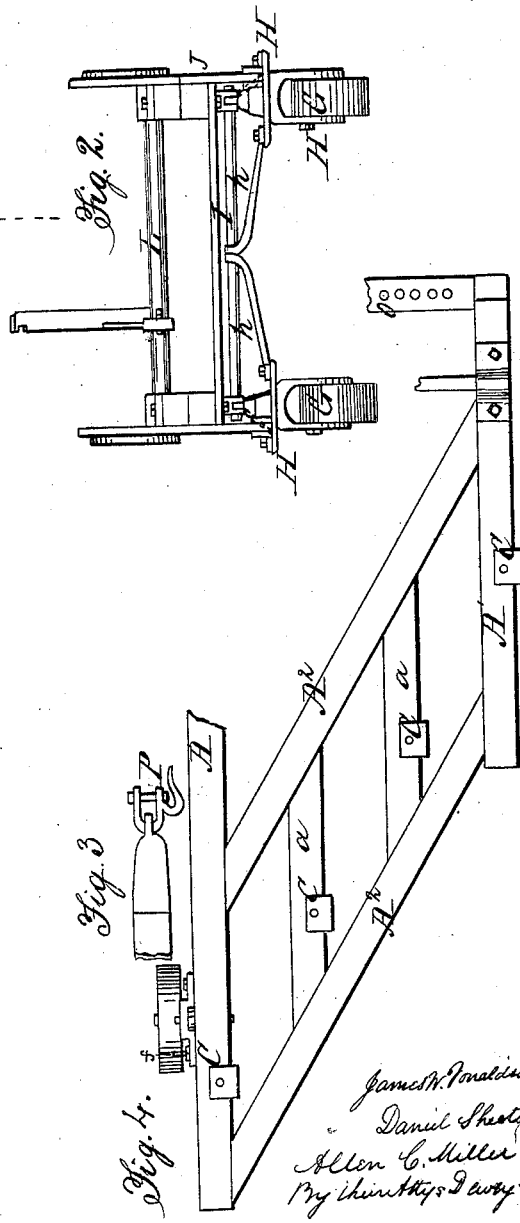

UNITED STATES PATENT OFFICE.

JAMES W. DONALDSON, DANIEL SHEETS, AND ALLEN C. MILLER, OF SUISUN, CALIFORNIA.

IMPROVEMENT IN GANG-PLOWS.

Specification forming part of Letters Patent No. 57,688, dated September 4, 1866.

*To all whom it may concern:*

Be it known that we, JAMES W. DONALDSON, DANIEL SHEETS, and ALLEN C. MILLER, of Suisun, county of Solano, State of California, have invented certain new and useful Improvements in Gang-Plows; and we do hereby declare the following description and accompanying drawings are sufficient to enable any person skilled in the art or science to which it most nearly appertains to make and use our said invention or improvements without further invention or experiment.

The nature of our invention consists in placing four plows diagonally across a frame to which they are attached, the two outer plows being attached to the outer or parallel bars of the frame, and the two inner plows to parallel braces between two diagonal bars, also to an upright adjustable wheel placed near the rear end or heel of the frame, and two caster-wheels attached to the forward end of the frame.

Referring to the drawings, Figure 1 represents a side elevation; Fig. 2, a front view of wheel and attachments; Fig. 3, plan of pole attachments; Fig. 4, plan of frame, showing manner of arranging and attaching plows.

A and A' represent the parallel bars of the frame, A' being the shortest, and both flush at the forward end of the frame. $A^2$ and $A^3$ are diagonal bars attached by bolts to the parallel bars. Between these diagonal bars are other or cross-bars $a$ $a'$—the whole frame so arranged as to resist pressure upon the angles and incapable of translation, so that it will not rack about. (Best shown in Fig. 4.)

The plows B B B' $B^2$ are four in number, nine inches in width, cutting furrows, with the natural reach in turning, of about forty-one inches. We prefer this number rather than three, of greater width, cutting a furrow of only about twelve inches, or less than forty inches in the aggregate, with the natural reach included, as we are confident that more ground can be plowed with less team-power by so arranging.

The plows we fasten in a diagonal line across the frame. B B are placed upon the parallel bars, B' and $B^2$ upon the cross-bars or braces $a$ $a'$, the whole attached by bent braces C C C C. Each brace is bent at an acute angle over the respective portion of the frame to which it is attached by bolts.

Forked braces D D D D are attached to each plow, one fork of which is connected to the top of the mold-board, the other to the main brace C, nearly on a line or plane with the top of the mold-board, converging back to a point where they are fastened to the frame, the two inner to the rear diagonal bar, the two outer to each of the respective parallel bars, near the angles in the frames. This manner of bracing the plow has particular reference to strength in the backward pressure or strain.

Ordinary braces are placed so as to connect the mold-boards or shares and land-sides with a supplemental brace placed vertically with the main brace and attached to it and the land-side.

A wheel, E, with arm F and scraper $f$, operating up and down in a staple, is attached to the rear end, A, of the frame. Also wheels G G, similar to those used for furniture, called "caster-wheels," are connected by bolts and nuts to turn-plates H H'. These turn-plates are attached to longitudinal and converging rods $h$ $h'$ $h^2$, underneath the frame to the cross-bar I.

Upright jointed bars J J are also attached to the sweep L in front of the driver's box M. This sweep is operated by a lever in a slotted curved bar having its bearings on each side of the frame, Figs. 1 and 2.

By this arrangement the front portions of the frame and plows are raised and lowered at will by the driver, the wheels G G traversing in the direction of the draft as well as the wheel E, which can also be raised or lowered, and assisting, with the forward wheels, to graduate the depth of the plows, and are kept clean by the scrapers N N $f$.

The pole is attached to a slotted bar, O, placed across the front end of the frame, so arranged that the plows may run to or from land by changing the pin which passes through the clevis and bars. A hook, P, to which a chain may be attached, is connected to the clevis, where more strength is required than that imparted by the pole.

It will readily be seen that by this device the plows are attached to the frame, and the whole carried along upon the wheels which revolve upon the unbroken ground, whereby the plows are relieved of downward pressure, each one being allowed sufficient space to skim the ground independently without a guide, and however great the weight placed upon the frame the plows will not be affected. When the end of the furrow is reached the frame is raised by the levers and bars, and the points of the plows elevated, the wheels G G accommodating themselves to the angle desired in turning.

The attachment of the plows upon their respective portions of the frame is such that no clogging can take place, as when plowing adobe or stubble ground, as no impediment presents itself above the mold-board, while the facilities for plowing the ground with care and swiftness will be found to be far superior to that of any gang-plow in use.

Having thus described our improved gang-plow, what we claim, and desire to secure by Letters Patent, is—

1. The peculiar construction of the frame, in order to obtain sufficient strength for a number of plows, by placing the diagonal bars $A^2 A^3$ between the parallel bars A A′ and the cross-braces $a\ a'$, substantially as described.

2. The manner of attachment of the plows to their respective portions of the frame by means of the bent braces C C C C passing over the top of said frame-work, as herein shown, in combination with the plows, substantially as described.

3. The adjustable wheel E and scraper $f$, with the wheels G G, scrapers N N, also the turn-plates H H, and connecting-rods $h\ h'$, with upright-bars J J, jointed at the turn-plate H, in combination with the sweep L, substantially as described, and for the purposes set forth.

In witness whereof we have hereunto set our hands and seals.

JAMES W. DONALDSON. [L. S.]
DANIEL SHEETS. [L. S.]
ALLEN C. MILLER. [L. S.]

Witnesses:
J. B. LEMON,
N. C. BUTLER.